INVENTOR.
MILTON E. CHANDLER
BY
Lester W Clark
AGENT

July 1, 1947.　　　M. E. CHANDLER　　　2,423,373
FUEL INJECTOR PUMP MECHANISM
Filed Aug. 7, 1945　　　2 Sheets-Sheet 2

INVENTOR.
MILTON E. CHANDLER
BY
Lester W Clark
AGENT

Patented July 1, 1947

UNITED STATES PATENT OFFICE 2,423,373

FUEL INJECTOR PUMP MECHANISM

Milton E. Chandler, New Britain, Conn., assignor, by mesne assignments, to Niles-Bement-Pond Company, West Hartford, Conn., a corporation of New Jersey Application August 7, 1945, Serial No. 609,350

11 Claims. (Cl. 103—2)

The invention relates to an injector pump of the type which includes a plurality of injector units, preferably arranged in an annular series and actuated by a common operating shaft, and the invention involves more particularly the lubricating means for such injector pump.

An important object of the invention is to insure proper lubrication for all the operating parts and at the same time to so regulate and control the oil pressure as to prevent any possible leakage or seepage of lubricating oil into the fuel supply system.

A further object of the invention is to provide an improved construction wherein the main operating shaft for the pump mechanism serves by means of a conduit therethru to effect discharge of oil from the main oil chamber and to thus maintain a circulation of oil thru the said chamber.

A further object of the invention is to provide a secondary chamber surrounding the operating shaft and interposed between the operating shaft and the fuel chamber, this secondary chamber being filled with a static fluid so as to provide heat insulation between hot oil flowing out thru the shaft and fuel in the fuel chamber.

Other objects and advantages of the present invention will be apparent from a consideration of the appended specification, claims and drawings in which:

Figure 1:
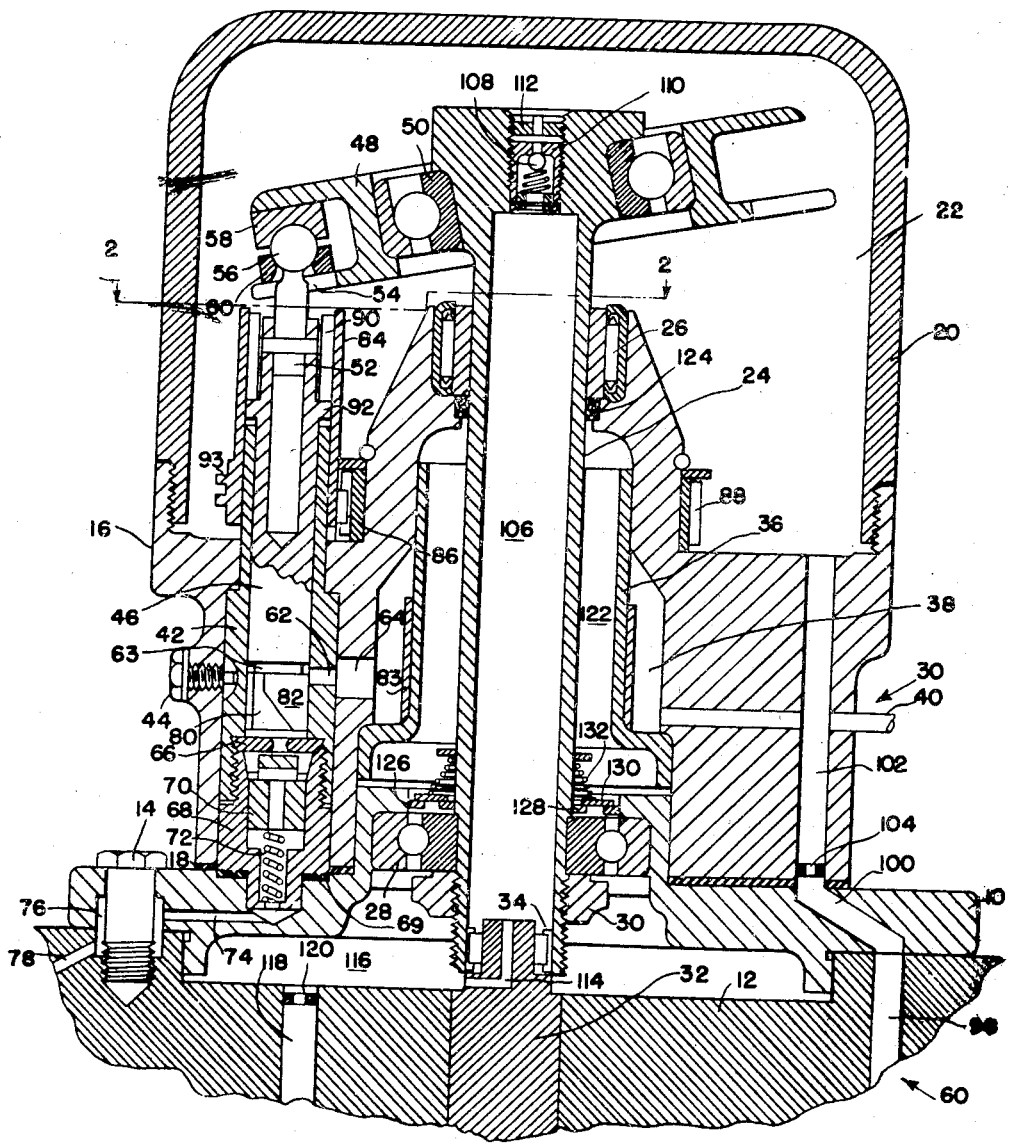
Fig. 1 is a vertical central sectional view thru an injector pump embodying the invention, only one of the several injector units being shown.

Referring to the drawings, 10 represents the base of the pump, this being adapted to be secured to a mounting pad formed on the surface of an engine crank case 12. As shown, it is held in place by cap screws, one of which is shown at 14. Mounted on the base 10 and secured thereto by means not shown is a housing member 16, a gasket 18 preferably being interposed between the housing member and the base. Threadedly connected with the housing member is a cover 20, which in conjunction with the housing member provides a main chamber 22. The base 10, the housing member 16 and the cover 20 will be referred to collectively as the "housing."

A plurality of injector units is mounted in the housing, only one such unit being shown in Fig. 1. These units are arranged in an annular series and the number of units may be varied to correspond with the number of cylinders in the engine. The number is frequently nine for a 9 or 18-cylinder engine. For operating the several injector units there is provided a central operating shaft 24 which is rotatably supported in the housing member 16 by a roller bearing 26 near the top of a housing member and by a ball bearing 28 near the bottom of the housing member. The ball bearing 28 is held in place by a nut 30 having threaded engagement with the lower end portion of the shaft. For rotating the operating shaft 24 there is provided a drive shaft 32 rotatably mounted in the crank case 12 and driven by the engine. The drive shaft 32 and the operating shaft 24 have separable interengaging parts at 34 for transmitting power from one shaft to the other.

Surrounding the operating shaft 24 and mounted in the housing member 16 is a cylindrical member 36. Formed in the housing member 16 is a fuel chamber 38, the cylindrical member 36 constituting the inner wall of the said fuel chamber. Fuel may be supplied under pressure to the fuel chamber 38 thru a fuel conduit 40 extending through the housing member 16.

Each injector unit includes a vertical hollow cylinder 42 mounted in a suitable aperture in the housing member 16 and held against rotation by the reduced end portion of a screw 44 entering a slot therein. Vertically movable in and closely fitting the cylinder 42 is a plunger 46.

Figure 2:
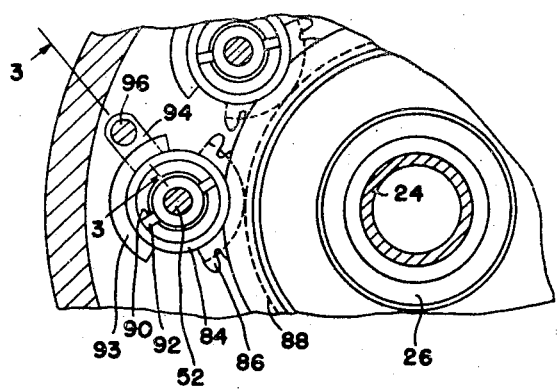
Fig. 2 is a fragmentary horizontal sectional view taken along the line 2—2 of Fig. 1.

For effecting vertical movements of the plunger 46 the operating shaft 24 carries near its upper end a wobble plate 48 which is in an inclined position and is connected with the shaft by means of a ball bearing 50. Connected with the plunger 46 is a rod 52 extending thru a slot 54 in the wobble plate and provided at its upper end with a ball portion 56. Shoes 58 and 60 embrace the ball portion 56 of the rod and are slidably movable in a suitable recess formed in the wobble plate. It will be seen that as the drive shaft 24 is rotated the wobble plate is prevented from partaking in the rotative movement, but on account of its angular connection with the shaft thru the ball bearing 50 it is given a wobble motion which causes the rod 52 and the connected plunger 46 to reciprocate to a fixed predetermined extent. As already explained, only one plunger 46 with its associated parts is shown in Fig. 1, but it will be understood that there is an annular series of such plungers and parts, two of them being shown in Fig. 2, all connected with and operated by the same wobble plate 48.

All of the plungers in the series are moved to the same extent but successively and in timed relationship with the reciprocation of the engine pistons.

The cylinder 42 has a fuel port 62 which is in communication thru an opening 64 in the housing member with the fuel chamber 38, and thus fuel may be admitted to the interior of the cylinder 42. At the lower end of the cylinder 42 is a disc 66 having a central aperture therein, this disc being held in place by a cylindrical member 68 having threaded engagement with the lower portion of the cylinder 42. A deformable washer 69, preferably of copper, is placed under the member 68 and the lower surface of member 68 is provided with a pair of sharp, concentric ridges, so that a fluid tight seal is provided when these two elements are pressed together. The member 68 is hollow and a valve element 70 is slidably mounted therein, and a coil spring 72 tends to hold the element 70 in its upper position to close the aperture in the disc 66. The valve element 70 has a central aperture therethru and there is also a central aperture in the lower end of the cylindrical member 68. The last said aperture is in communication with a conduit 74 formed in the base 10, this conduit communicating with a recess 76 surrounding the cap screw 14, and this recess in turn communicating with a conduit 78 formed in the crank case of the engine and leading to the corresponding engine cylinder. It will be seen that when the valve element 70 is forced downward by fuel pressure, a continuous passageway is established from the aperture in the disc 66 to the conduit 78 and thence to the engine cylinder.

When the plunger 46 is in its upper position it permits a charge of fuel to enter the lower portion of the cylinder 42 thru the port 62, and when the plunger is moved downward the charge is forced past the valve element 70 and into the cylinder of the engine. The fuel may be forced into the engine at a very high pressure.

In order that the amount of fuel forced into the engine cylinder may be varied, the plunger 46 is provided with a recess 80 having a helically contoured portion 82. By means to be described, the plunger 46 may be adjusted rotatively and it will be seen that when the upper portion of the recess 80 is moved to register with the port 62 the plunger will develop no pressure to force fuel into the engine cylinder. However, when the plunger is adjusted to bring the said upper portion of the recess out of register with the port, varying amounts of fuel will be delivered into the cylinder. The amount so delivered is dependent upon the rotative adjustment of the cylinder which in turn determines the point at which communication with the port 62 is cut off by the helically contoured portion 82 of the recess 80.

For rotatively adjusting the plunger 46 there is provided a cylindrical member 84 mounted on the upper portion of the cylinder 42. The cylindrical member 84 is provided with a segmental pinion at 86 which meshes with a ring gear 88 rotatively mounted on the central portion of the housing member 16. The cylindrical member 84 is provided with longitudinal interior grooves 90, and lugs 92 on the plunger 46 extend into the grooves 90 so that the plunger is connected for rotative movement in unison with the cylindrical member 84. By suitable means not shown, the ring gear 88 can be rotatively adjusted in accordance with engine operating conditions, and when it is so adjusted the segmental pinions for all of the injector units are correspondingly moved, thus correspondingly changing the rotative positions of the several plungers 46 and changing the amounts of fuel delivered.

The pumping action is terminated at the same point in the stroke of plunger 46, regardless of its rotative adjustment. This termination takes place when an annular groove 63 comes opposite the port 62. Groove 63 is in communication thru the recess 80 with the space ahead of plunger 82. When the groove 63 comes opposite the port 62, the pressure ahead of the plunger is suddenly relieved and the pump "spills over" thru port 62. A hardened steel sleeve 83 encircles the member 36 opposite the ports 62, to prevent erosion of the member 36 by the high velocity "spill-over" jets.

Figure 3:
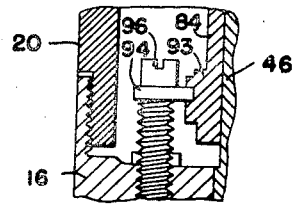
Fig. 3 is a fragmentary vertical sectional view taken along the line 3—3 of Fig. 2.

It is preferable to provide means which permit individual adjustments of the rotative positions of the several plungers so that during the initial adjusting and testing of the pump the several plungers may be individually rotated to insure uniformity of delivery from all of them. In order that such individual rotative adjustment may be effected, the pinion 86 and ring gear 88 are provided with helical teeth, and means is provided for vertically adjusting each cylindrical member 84 so as to individually rotate the corresponding plunger thru the agency of the helical teeth and independently of the other plungers. The gear 88 has sufficient width to permit the necessary movement of the cylindrical member 84, and to still remain in mesh with the segmental pinion 86. To effect such vertical adjustment of the cylindrical member 84, it is provided with a horizontally grooved projection 93 and a shoe 94 extends into the groove in the projection 93, as shown in Fig. 3. This shoe may be moved upward or downward by means of a screw 96 extending into the housing member 16. It will be seen that by adjusting the screws 96 for the several injector units, the several plungers 46 may be individually adjusted rotatively to insure uniformity of fuel delivery. It will be understood that the adjustment of the several screws 96 is effected with the cover 20 removed.

It will be observed that the upper end of the operating shaft 24, the wobble plate 48 together with the bearing 50 therefor, and the upper ends of the plungers 46 together with the operating and adjusting means therefor, are all positioned in the before-mentioned main chamber 22 above the housing member 16 and within the cover 20. In order that these various parts may be properly lubricated the entire chamber 22 is filled with lubricating oil, preferably under pressure. For supplying oil to the chamber 22 there is provided in the crank case 12 a conduit 98 which leads from the main oil supply of the engine. The conduit 98 communicates with a conduit 100 in the base 10, and this in turn communicates with a conduit 102 formed in the housing member 16 and leading to the chamber 22. In order that the flow of oil to the chamber 22 may be properly limited, a restriction 104 may be provided in the conduit 102.

In order that there may be circulation of oil thru the chamber 22, an oil discharge outlet is provided and, preferably and as shown, this outlet is in the form of a conduit 106 within and extending longitudinally of the operating shaft 24. Preferably, an automatically closing relief valve, such as a ball valve 108, is provided at the entrance end of the conduit 106. This valve is mounted in a cylindrical valve member 110 threaded into an opening in the upper end portion of the shaft. A centrally apertured disc 112 is also threaded into the upper end portion of the shaft. The conduit 106 communicates at its lower end with a conduit 114 formed in the drive shaft 32, this latter conduit discharging into a chamber 116 formed between the base 10 and the mounting pad. A drain conduit 118 leads from the chamber 116 and this conduit may be provided with a restriction 120 to retard the flow of oil thru the conduit so as to keep the chamber 116 full of oil and thus provide lubrication for the bearing 28.

Reference has already been made to the cylindrical member 36 which cooperates with the housing member 16 to form the annular fuel chamber 38. The said member 36 also serves in cooperation with the operating shaft 24 and with other parts to form an annular fluid containing chamber 122. It will be noted that this chamber 122 surrounds the shaft 24 and is surrounded by the fuel chamber 38. The chamber 122 is between the upper shaft bearing 26 and the lower shaft bearing 28. The chamber 122 is normally filled with oil but there is no flow of oil thru the chamber, and the oil remains in static condition. In order to insure the static condition of the oil in the chamber 122 there is preferably provided a sealing ring 124, formed of felt or other suitable material, to prevent flow of oil from the bearing 26 into the chamber 122. Flow of oil into or out of the chamber 122 at the bottom thereof is prevented by a plurality of sealing rings. A stationary ring 126 is secured to the base 10 immediately above the bearing 28 and a rotatable ring 128 at the same level is secured to the shaft 24. A ring 130 overlaps and bridges the two rings 126 and 128 and is pressed against them by a coil spring 132.

It has already been stated that fuel is supplied to the fuel chamber 38 under pressure, which pressure may, for instance, be 30 lbs. per square inch. The pressure of oil supplied thru the conduit 98 may be much higher than the fuel pressure as, for instance, 60 lbs. per square inch. The oil pressure is substantially reduced before reaching the chamber 22 by means of the restriction 104, and the relief valve 108 is of such size and is so adjusted that it prevents the pressure in the chamber 22 from exceeding a predetermined maximum. The maximum pressure in the chamber 22 is so determined that it is below the pressure in the fuel chamber and it may, for instance, be 25 lbs. per square inch.

The pressure of the oil in the secondary oil chamber 122 may be indeterminate, being dependent to some extent upon the leakage past the sealing devices 124 and 130. However, the pressure in this chamber cannot be greater than that in chamber 122, and it will presumably be substantially less. It will therefore be seen that the pressures in the main oil chamber 22 and in the secondary oil chamber 122 will in any event be below that in the fuel chamber 38, the result being that if there is any leakage, around the member 36 or around the cylinders 42 or otherwise, it will be leakage of fuel from the fuel chamber and not leakage of oil into the fuel chamber. Thus there is definite assurance that there will be no contamination of fuel by the lubricating oil.

As already stated, the fluid, that is lubricating oil, in the chamber 122 is static, and it will be seen that this body of static oil is interposed between the shaft 24 and the fuel chamber. The oil in the conduit 106 within the shaft 24 may be relatively hot, and the body of static oil in the chamber 122 therefore serves to provide heat insulation between such hot oil and the fuel passing thru the fuel chamber 38.

When the mechanism is positioned as shown in Fig. 1, with the operating shaft vertical and with the wobble plate at the top, the inlet to the oil discharge duct is near the top of the main chamber 22 and this prevents any accumulation of air in the chamber 22 such as might interfere with proper lubrication. Accumulated air could, at most force the level of the oil down to the entrance to the conduit 106 at the top of the shaft, but ordinarily by an aspirating effect any entrapped air would be commingled with the oil and would be carried out thru the discharge conduit.

While I have shown and described a certain preferred embodiment of my invention, modifications thereof will readily occur to those skilled in the art, and I therefore intend my invention to be limited only by the appended claims.

I claim as my invention:

1. An injector pump for an internal combustion engine comprising in combination, a housing having therein a main chamber and a separate fuel chamber, means for supplying fuel under pressure to the fuel chamber, a rotary operating shaft having a portion thereof in the main chamber, means driven by the shaft for discharging measured quantities of fuel from the fuel chamber during each rotation of the shaft, means for supplying lubricating oil under pressure to the main chamber, a conduit within and extending longitudinally of the operating shaft for the discharge of oil from the main chamber, and a relief valve in the said duct for maintaining the oil pressure in the main chamber below the fuel pressure in the fuel chamber to prevent any leakage of oil from the main chamber to the fuel chamber.

2. An injector pump for an internal combustion engine comprising in combination, a housing having therein a main chamber and a separate fuel chamber, means for supplying fuel under pressure to the fuel chamber, a central rotary operating shaft having a portion thereof in the main chamber, an annular series of injector units in the housing surrounding the operating shaft, each unit including a vertically movable plunger extending into the main chamber and connected with the shaft to be operated thereby so as to discharge a measured quantity of fuel from the fuel chamber during each rotation of the shaft, means for supplying lubricating oil under pressure to the main chamber, a conduit within and extending longitudinally of the operating shaft for the discharge of oil from the main chamber, and a relief valve in the said duct for maintaining the oil pressure in the main chamber below the fuel pressure in the fuel chamber to prevent any leakage of oil from the main chamber to the fuel chamber.

3. An injector pump for an internal combustion engine comprising in combination, a housing having therein a main chamber and a separate fuel chamber, means for supplying fuel under pressure to the fuel chamber, a central rotary operating shaft having a portion thereof in the main chamber, an annular series of injector units in the housing surrounding the operating shaft, each unit including a vertically movable plunger extending into the main chamber, a wobble plate in the main chamber carried by the operating shaft, connections in the main chamber between the wobble plate and the several plungers whereby each plunger is moved to discharge a measured quantity of fuel from the fuel chamber during each rotation of the shaft, means for supplying lubricating oil under pressure to the main chamber, a conduit within and extending longitudinally of the operating shaft for the discharge of oil from the main chamber, and a relief valve in the said duct for maintaining the oil pressure in the main chamber below the fuel pressure in the fuel chamber to prevent any leakage of oil from the main chamber to the fuel chamber.

4. An injector pump for an internal combustion engine comprising in combination, a housing having a main chamber therein, a central rotary operating shaft having a portion thereof in the main chamber, an annular fuel chamber in the housing separate from the main chamber and surrounding the shaft, means for supplying fuel under pressure to the fuel chamber, an annular series of injector units in the housing surrounding the fuel chamber, each unit including a vertically movable plunger extending into the main chamber and connected with the shaft to be operated thereby so as to discharge a measured quantity of fuel from the fuel chamber during each rotation of the shaft, means for supplying lubricating oil under pressure to the main chamber, a conduit within and extending longitudinally of the operating shaft for the discharge of oil from the main chamber, and a relief valve in the said duct for maintaining the oil pressure in the main chamber below the fuel pressure in the fuel chamber to prevent any leakage of oil from the main chamber to the fuel chamber.

5. An injector pump for an internal combustion engine comprising in combination, a housing having therein a main chamber and a separate fuel chamber, means for supplying fuel to the fuel chamber, a central rotary operating shaft positioned with a portion thereof in the main chamber near the top thereof, the upper end of the shaft being below the top of the chamber, an annular series of injector units in the housing surrounding the operating shaft, each unit including a vertically movable plunger extending into the main chamber, a wobble plate in the main chamber carried by the operating shaft, connections in the main chamber between the wobble plate and the several plungers whereby each plunger is moved to discharge a measured quantity of fuel from the fuel chamber during each rotation of the shaft, means for supplying lubricating oil to the main chamber, and a duct within the shaft extending downward from the upper portion of the main chamber for the discharge of oil therefrom.

6. An injector pump for an internal combustion engine comprising in combination, a housing having therein a main chamber and a separate fuel chamber, means for supplying fuel under pressure to the fuel chamber, a central rotary operating shaft positioned with its upper end in the main chamber near the top thereof, an annular series of injector units in the housing surrounding the operating shaft, each unit including a vertically movable plunger extending into the main chamber and connected with the shaft to be operated thereby so as to discharge a measured quantity of fuel from the fuel chamber during each rotation of the shaft, means for supplying lubricating oil under pressure to the main chamber, a duct within the shaft extending downward from the upper end thereof for the discharge of oil from the main chamber, and a relief valve in the duct for maintaining the oil pressure in the main chamber below the fuel pressure in the fuel chamber to prevent any leakage of oil from the main chamber to the fuel chamber.

7. The combination in an injector pump for an internal combustion engine, of a housing having a main chamber therein, a central rotary operating shaft having a portion thereof in the main chamber, an annular fuel chamber in the housing separate from the main chamber and surrounding the shaft, means for supplying fuel to the fuel chamber, an annular series of injector units in the housing surrounding the fuel chamber, each unit including a vertically movable plunger extending into the main chamber and connected with the shaft to be operated thereby so as to discharge a measured quantity of fuel from the fuel chamber during each rotation of the shaft, means for supplying lubricating oil to the main chamber, a duct within and extending longitudinally of the operating shaft for the discharge of oil from the main chamber, and an annular fluid containing chamber surrounding the shaft and surrounded by the annular fuel chamber, the fluid in the last said chamber being static and providing heat insulation between the oil in the shaft and the fuel in the fuel chamber.

8. The combination in an injector pump for an internal combustion engine, of a housing having a main chamber therein, a central rotary operating shaft having a portion thereof in the main chamber, an annular fuel chamber in the housing separate from the main chamber and surrounding the shaft, means for supplying fuel to the fuel chamber, an annular series of injector units in the housing surrounding the fuel chamber, each unit including a vertically movable plunger extending into the main chamber, a wobble plate in the main chamber carried by the operating shaft, connections in the main chamber between the wobble plate and the several plungers whereby each plunger is moved to discharge a measured quantity of fuel from the fuel chamber during each rotation of the shaft, means for supplying lubricating oil to the main chamber, a duct within and extending longitudinally of the operating shaft for the discharge of oil from the main chamber, and an annular fluid containing chamber surrounding the shaft and surrounded by the annular fuel chamber, the fluid in the last said chamber being static and providing heat insulation between the oil in the shaft and the fuel in the fuel chamber.

9. The combination in an injector pump for an internal combustion engine, of a housing having a main chamber therein, a central rotary operating shaft having a portion thereof in the main chamber, an annular fuel chamber in the housing separate from the main chamber and surrounding the shaft, means for supplying fuel under pressure to the fuel chamber, an annular series of injector units in the housing surrounding the operating shaft and the fuel chamber, each unit including a vertically movable plunger extending into the main chamber and connected with the shaft to be operated thereby so as to discharge a measured quantity of fuel from the fuel chamber during each rotation of the shaft, means for supplying lubricating oil under pressure to the main chamber, a duct within and extending longitudinally of the operating shaft for the discharge of oil from the main chamber, means associated with the said duct for maintaining the oil pressure in the main chamber below the fuel pressure in the fuel chamber to prevent any leakage of oil from the main chamber to the fuel chamber, and an annular oil containing chamber surrounding the shaft and surrounded by the annular fuel chamber, the oil in the last said chamber being static and providing heat insulation between the oil in the shaft and the fuel in the fuel chamber.

10. The combination in an injector pump for an internal combustion engine, of a housing having a main chamber therein, a central rotary operating shaft having a portion thereof in the main chamber, longitudinally spaced bearings for the shaft, an annular fuel chamber in the housing separate from the main chamber and surrounding the shaft, means for supplying fuel to the fuel chamber, an annular series of injector units in the housing surrounding the fuel chamber, each unit including a vertically movable plunger extending into the main chamber and connected with the shaft to be operated thereby so as to discharge a measured quantity of fuel from the fuel chamber during each rotation of the shaft, means for supplying lubricating oil to the main chamber, a duct within and extending longitudinally of the operating shaft for the discharge of oil from the main chamber, and an annular fluid containing chamber surrounding the shaft and surrounded by the annular fuel chamber, the last said chamber being between the bearings for the shaft and the fluid therein being static and providing heat insulation between the oil in the shaft and the fuel in the fuel chamber.

11. The combination in an injector pump for an internal combustion engine, of a housing having a main chamber therein, a central rotary operating shaft having a portion thereof in the main chamber, longitudinally spaced bearings for the shaft, an annular fuel chamber in the housing separate from the main chamber and surrounding the shaft, means for supplying fuel to the fuel chamber, an annular series of injector units in the housing surrounding the fuel chamber, each unit including a vertically movable plunger extending into the main chamber and connected with the shaft to be operated thereby so as to discharge a measured quantity of fuel from the fuel chamber during each rotation of the shaft, means for supplying lubricating oil to the main chamber, a duct within and extending longitudinally of the operating shaft for the discharge of oil from the main chamber, an annular oil containing chamber surrounding the shaft and surrounded by the annular fuel chamber, and sealing means between the respective bearings and the last said chamber to prevent the flow of oil from the bearings into the chamber so that the oil in the chamber is static and provides heat insulation between the oil in the shaft and the fuel in the fuel chamber.

MILTON E. CHANDLER.

REFERENCES CITED

The following references are of record in the file of this patent:

UNITED STATES PATENTS

| Number | Name | Date |
| --- | --- | --- |
| 2,031,346 | Wahlmark | Feb. 18, 1936 |
| 2,107,079 | Mentele | Feb. 1, 1938 |
| 2,131,857 | Lauret | Oct. 4, 1938 |
| 2,251,552 | Surdy | Aug. 5, 1941 |
| 2,370,506 | Tabb | Feb. 27, 1945 |